April 16, 1963 W. M. HARPER 3,085,387
ROTARY LAWN MOWER SHARPENING HATCH
Filed Dec. 21, 1961

INVENTOR
Will M. Harper

BY Holcombe, Wetherill & Brisebois
ATTORNEYS

United States Patent Office 3,085,387
Patented Apr. 16, 1963

3,085,387
ROTARY LAWN MOWER SHARPENING HATCH
Will M. Harper, P.O. Box 777, Monroe, La.
Filed Dec. 21, 1961, Ser. No. 161,099
3 Claims. (Cl. 56—25.4)

This invention relates to a rotary power mower, particularly the rotating cutting disc type mower.

Early rotary power mowers were made with little or no protection for the rotating blade. This was soon found to be a highly dangerous device as there was no protection to prevent the operator and others nearby from coming into contact with the blade, or to protect them from debris thrown from the blade or pieces of the blade, if it disintegrated. Therefore, it was found desirable to protect the rotating element by having a substantial plate over the element with a skirt therearound. It was also found desirable to have an opening in the skirt to discharge the grass cuttings away from the motor and the operator.

The sharpening of the blade represents a dangerous problem, as it is necessary to lay the mower on its side or invert it, which action with a gasoline powered motor creates a dangerous condition, due to the spilled gasoline and cylinder oil, or a combination of both, and the danger or injury to the operator in handling the mower blade for sharpening.

It is therefore an object of the present invention to provide a safer and quicker means of access to the rotating blade for sharpening, a means whereby the operators hands never touch the mower blade.

It is another object of the present invention to provide access to the blade while maintaining the mower in its normal operating position.

It is a further object of the present invention to provide access to the blade and to also provide a closure for the protection of the motor and the operator.

These and other objects, which characterize this invention are pointed out with particularity in the claims annexed to and forming part of this application. For a better understanding of the invention, however, and the advantages possessed by it, reference should be had to the accompanying drawings and descriptive matter in which have been illustrated and described a preferred embodiment of the invention.

Figure 1:
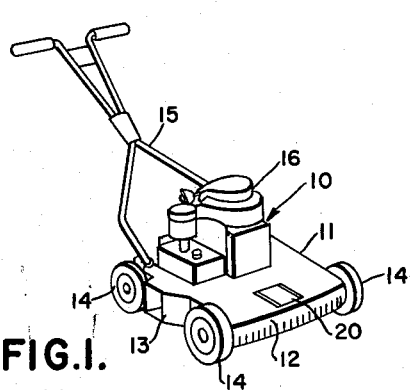
FIG. 1 is a perspective view of the mower.

The mower 10, shown in FIG. 1, comprises a housing 11 having a skirt portion 12 therearound. There is an opening 13 in this skirt portion forming a chute. The housing 11 is supported on four wheels 14, attached thereto, and is manually propelled by means of the handle 15 in the usual manner. A gasoline motor 16 is centrally mounted on the housing 11 with a vertical drive shaft projecting downwardly through the housing. Mounted on the lower end of the drive shaft is a cutter blade 18 having sharpened portions 19, 19 on the outer ends thereof. There is an opening 20 in the front part of the housing over the blade, so arranged as to expose the sharpened portion 19. This opening 20 has a sliding cover 21 mounted thereon. This cover 21 is mounted on the housing 11 by a welded piece 22 having an opening between the welded piece 22 and the housing 11 to receive the cover 21 in sliding engagement therewith.

Figure 4:
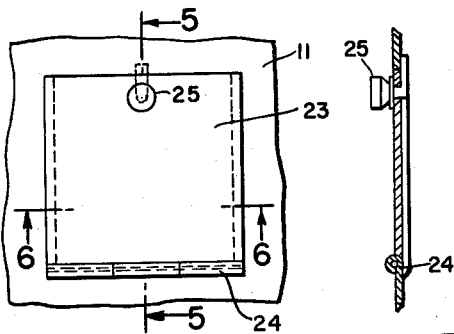
FIG. 4 is a modification of the closure shown in FIG. 2.
Figure 5:
FIG. 5 is a sectional view on line 5—5 of FIG. 4.
Figure 2:
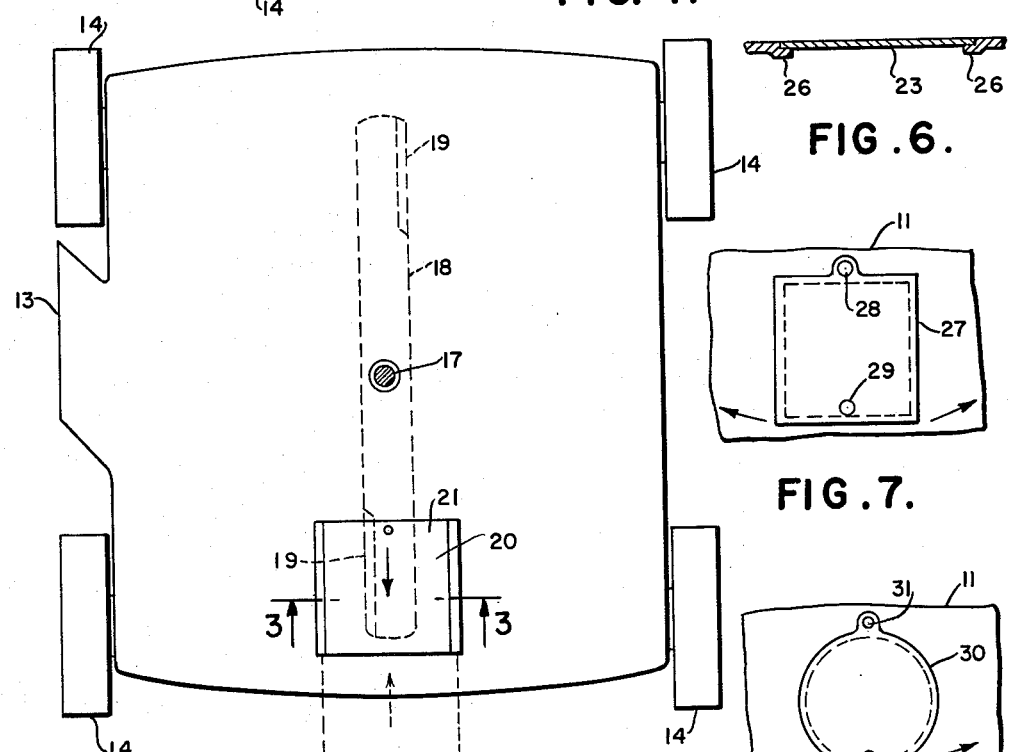
FIG. 2 is a plan view of the mower with the motor and handle removed.
Figure 6:
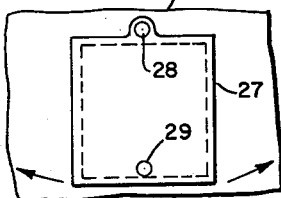
FIG. 6 is a sectional view on line 6—6 of FIG. 4.

A modified form of this cover is shown in FIGS. 4 and 5 wherein the housing 11 has an opening therein and the cover 23 is hingedly mounted at 24 on the housing 11. A rotary latch 25 is mounted at the other end of the cover 23 so as to hold this cover in place on the housing 11. The cover 23 is received in and held by the lip portions 26 of the housing, shown in FIG. 6. While in the cover described, and illustrated in FIG. 4, is square, this cover could be round and such is made part of this disclosure.

Figure 7:
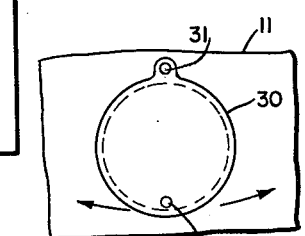
FIG. 7 is a second modification of the closure shown in FIG. 2.

A second modification is shown in FIG. 7, wherein the cover 27 is pivotally mounted on the housing 11 by means of the pivot 28 and is retained in a closed position by means of the latch elements 29.

Figure 8:
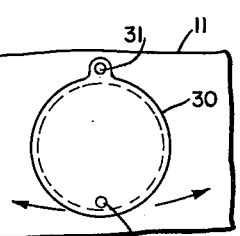
FIG. 8 is a third modification of the closure shown in FIG. 2.

In a third modification, shown in FIG. 8, the housing 11 has a circular opening therein and the cover 30 is pivoted by means of the rivet 31 and may be swung to one side by means of the handle 32.

Figure 9:
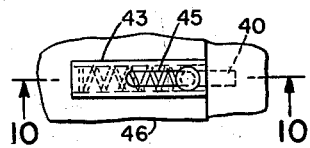
FIG. 9 is a plan view of the spring operated latch.
Figure 10:
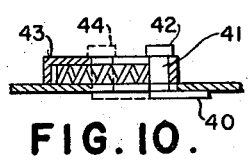
FIG. 10 is a sectional view on line 10—10 of FIG. 9.

A spring operated latch, which may be used with the cover, shown in FIGS. 4, 7 and 8 is illustrated in FIGS. 9 and 10, wherein the latch bar 40 has the vertical boss portion 41 terminating in the handle portion 42. This latch bar operates within the housing 43 against the spring loading element 44 which spring loading element tends to retain it in its forward position. The opening 45 in the top of the housing 43 limits the movement of the latch, and this opening must be at least as long as the portion 40 in order to allow the latch to be forced rearwardly against the spring loading cover and free the cover 46 on which it is mounted.

In operation, a motor 16 drives the shaft 17 to rotate the blade 18. The handle 15 provides a means of manually propelling the cutter through the grass. As the motor rotates the end portions 19 of the blade 18 come into contact with the grass and sever the same. The grass is discharged through the chute 13. It is necessary that the grass be discharged away from the gasoline motor as the grass cuttings and their debris will foul the motor, close the air intake, and generally cause a nuisance.

When it is desired to sharpen the blade the rotary mower is maintained in its normal position. The motor is stopped, the cover 21 is slid into the open position, the blade 18 is rotated until it comes under the opening 20 and then the sharp portion 19 is filed to produce the necessary sharpening. The blade is then rotated through one-half revolution until the other end portion 19 comes under the opening 20 and it is sharpened in a similar manner.

Figure 3:
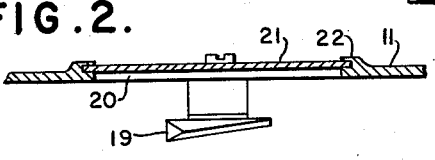
FIG. 3 is a sectional view on line 3—3 of FIG. 2.

It is desirable in sharpening the blade of a gasoline driven motor, that the mower be not inverted or tilted to one side as this causes the oil and gasoline to leak from the carburetor and tank and create a hazardous condition. The opening 20 provides access to the rotary blade while maintaining the machine in its normal position, and it is necessary that this opening 20 have a removable cover 21 thereon, as this prevents the discharge of the cuttings and other debris through this opening where they come into contact with the mower, clogging the air intake so as to choke the motor. This cover also provides protection for the operator and others nearby against debris that may be forced upwardly by the motor blade, such as glass and wood chips, which is quite common, when mowing lawns with a rotary mower, as the mower quite often comes into contact with bottles and other broken glass hidden by the grass as well as tree roots and other obstacles. The blade rotating at a high rate of speed forces portions of these objects upwardly with considerable force and it is therefore necessary that the opening 20 have a cover 21, as shown in FIG. 3, or the hinged cover 23, shown in FIG. 4, or the pivoted cover 27, shown in FIGS. 7 and 8. The hinged circular cover similar to square cover shown in FIG. 4 may also be used.

While in accordance with the provisions of the statute there have been illustrated and described the best form of embodiment of this invention, now known, it will be apparent to those skilled in the art that changes may be made in the form of the apparatus and process disclosed without departing from the spirit of this invention as set forth in the appended claims, and that in some cases certain features of this invention may be used to advantage without a corresponding use of other features.

What is claimed is:

1. In a rotary mower, comprising in combination:
   (a) a housing having an upper substantially flat surface supported by four wheels mounted on said housing,
   (b) a gasoline powered motor mounted on the upper surface of said housing with a drive shaft through said housing, having a rotary blade thereon said blade having outer sharpened portions,
   (c) a handle to propel said housing,
   (d) and an access opening through the upper surface of said housing over an entire outer sharpened end portion of said blade with a removable cover therefor.

2. A rotary mower as claimed in claim 1, wherein said access opening has a strip attached to the upper surface of said housing adjacent to opposite sides of said opening to hold a cover for said opening in sliding engagement therewith.

3. A rotary mower as claimed in claim 1, in which said access opening has a cover hinged at one end with a locking means at the other end.

References Cited in the file of this patent
UNITED STATES PATENTS

| | | |
|---|---|---|
| 2,734,327 | Whitney | Feb. 14, 1956 |
| 2,857,727 | Cole | Oct. 28, 1958 |
| 2,861,611 | Considder | Nov. 25, 1958 |
| 2,984,961 | Judkins | May 23, 1961 |
| 2,990,666 | Blume | July 4, 1961 |